United States Patent
Piirainen et al.

(10) Patent No.: US 6,654,844 B1
(45) Date of Patent: Nov. 25, 2003

(54) METHOD AND ARRANGEMENT FOR CONNECTING PROCESSOR TO ASIC

(75) Inventors: Olli Piirainen, Oulu (FI); Aki Happonen, Kiiminki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/423,134

(22) PCT Filed: May 12, 1998

(86) PCT No.: PCT/FI98/00402

§ 371 (c)(1),
(2), (4) Date: Feb. 4, 2000

(87) PCT Pub. No.: WO98/52123

PCT Pub. Date: Nov. 19, 1998

(30) Foreign Application Priority Data

May 15, 1997 (FI) .................................................. 972091

(51) Int. Cl.[7] .............................................. G06F 13/00
(52) U.S. Cl. ..................................................... 710/305
(58) Field of Search .......................... 710/72, 107, 305, 710/306

(56) References Cited

U.S. PATENT DOCUMENTS

| | | | | |
|---|---|---|---|---|
| 5,255,375 A | * | 10/1993 | Crook et al. ................. | 710/105 |
| 5,325,491 A | * | 6/1994 | Fasig ........................ | 710/300 |
| 5,329,630 A | | 7/1994 | Baldwin | |
| 5,335,338 A | | 8/1994 | Proesel | |
| 5,339,395 A | | 8/1994 | Pickett et al. | |
| 5,428,623 A | * | 6/1995 | Rahman et al. .............. | 714/724 |
| 5,758,107 A | * | 5/1998 | Robles et al. ................ | 710/307 |
| 6,170,049 B1 | * | 1/2001 | So .............................. | 711/130 |

FOREIGN PATENT DOCUMENTS

| | | |
|---|---|---|
| EP | 0744684 | 11/1996 |
| GB | 2 217 064 A | 10/1989 |

OTHER PUBLICATIONS

EDN–Design Feature, vol. 39, No. 10, May 1994, Rabinovich R.O., "Transition maps guide successful asynchronous state–machine design", see the whole document.

* cited by examiner

*Primary Examiner*—Glenn A. Auve
(74) *Attorney, Agent, or Firm*—Pillsbury Winthrop LLP

(57) ABSTRACT

The invention relates to a method and arrangement for connecting a processor to an ASIC. In the arrangement, the processor generates control signals employed when the processor reads data from and writes data to the ASIC. The arrangement comprises means (10) for receiving control signals from the processor and generating read and write signals on the basis of the received signals. The means (10) are implemented by an asynchronous state machine that changes its state on the basis of the received signals. The means (10) change their state without a synchronizing clock signal.

23 Claims, 2 Drawing Sheets

METHOD AND ARRANGEMENT FOR CONNECTING PROCESSOR TO ASIC

This application is the national phase of international application PCT/FI98/00402 filed May 12, 1998 which designated the U.S.

FIELD OF THE INVENTION

The invention comprises a method for connecting a processor to an ASIC, in which method the processor generates control signals employed when data is read from and written to the ASIC, and in which method the control signals generated by the processor are received, and read and write signals are generated on the basis of the received control signals.

The invention also comprises an arrangement for connecting a processor to an ASIC, which processor generates control signals employed when data is read from and written to the ASIC, which arrangement comprises means for receiving control signals from the processor and generating read and write signals on the basis of the received control signals

DESCRIPTION OF THE PRIOR ART

In electronic equipment, a processor environment is used where the processor is integrated to an external process or a component, such as an ASIC (Application Specific Integrated Circuit). Integration is accomplished by means of different input and output circuits, such as flip-flops. Integration also comprises different types of bus architectures for transmitting signals. The signals to be transmitted can include for example data, control or state signals.

In the processor environment, the signals are usually processed in a number of different components operating in synchronous or asynchronous mode. Processing in different components requires the components to be interconnected. However, interconnecting the components is not a simple task, since the signals usually call for accurate timing. Connecting for example the ASIC to a data bus in a digital DPS processor causes timing problems and thus complicates the transmission and processing of signals. For example communication frequency, control signals, bus architecture and different signal levels must be taken into account when interconnecting the components. Especially high frequency operation of the components brings about problems in signal timing.

The data bus of the processor is controlled by different control signals. Data is written to and read from the data bus by means of said control signals. The extremely accurate timing of the control signals is important so that the operations would take place at a desired moment. However, generating and timing the control signals is difficult. Timing problems have been solved by employing different types of interface architectures between the circuits to be interconnected. The interface architectures have been synchronous. Prior art interface architecture solutions have only partially solved the timing problems arising during the write and read operation.

Different types of synchronous flip-flops, i.e. FF solutions have been employed between the DSP processor and the ASIC. In addition, an OR element signal has been generated from the signals arriving from the processor to the ASIC, the OR element signal being employed as a clock signal for ASIC data and address registers. The flip-flops employed in the solution have been synchronized to the clock signal supplied by the processor. If for some reason the synchronization has been lost, the signals have reached a condition referred to as metastability. Signals in the metastabile state are unstable causing unpredictable and unwanted operations.

GB-A-2217064 describes a multiprocessor system comprising at least two asynchronous processors co-processing data. In the system, the processors perform handshaking implemented by means of an asynchronous state machine. The processors expect however a response of some kind from one another during the handshaking.

U.S. Pat. No. 5,339,395 describes an interface arrangement employed in a data transmission between a peripheral equipment and the data bus of a processor. The processor performs retrieval operations by fetching data from the memory on the basis of an address. The interface can comprise both synchronous and asynchronous modes of operation. The solution presented in the prior art document employs however a state machine changing its state on the basis of the received clock signal.

EP 744684 presents a solution for an ASIC bus interface. The bus interface enables that the clock signals can be connected between the ASIC and the processor in real time. The solution comprises a master state machine and several synchronizing state machines. The arrangement comprises however a clock generator generating clock signals for each synchronizing state machine.

BRIEF DESCRIPTION OF THE INVENTION

The object of the present invention is to implement an arrangement that can be employed between a DSP processor and an ASIC enabling the elimination of timing problems involved in a write and read operation phase.

This object is achieved by the method presented in the preamble characterized by receiving the control signals and generating the read and write signals by an asynchronous state machine changing its state on the basis of the received control signals without a synchronizing clock signal being supplied to the state machine.

This object is also achieved by the arrangement presented in the preamble characterized in that the means are implemented by an asynchronous state machine changing its state on the basis of the received control signals, and that the means change their state without the need of a synchronizing clock signal.

The arrangement of the invention provides considerable advantages. The arrangement uses the asynchronous state machine generating the write and read signals by means of the control signals without any timing problems. The elimination of the timing problems enables the data always to be written to and read from the desired destination. The arrangement of the invention enables different clock signals to be used in the processor and the ASIC. Different clock signals enable for example the processor to be updated without causing problems to the ASIC operation.

BRIEF DESCRIPTION OF THE DRAWINGS

In the following, the invention is described in more detail with reference to the examples illustrated in the accompanying drawings, in which.

DETAILED DESCRIPTION OF THE INVENTION

Figure 1:
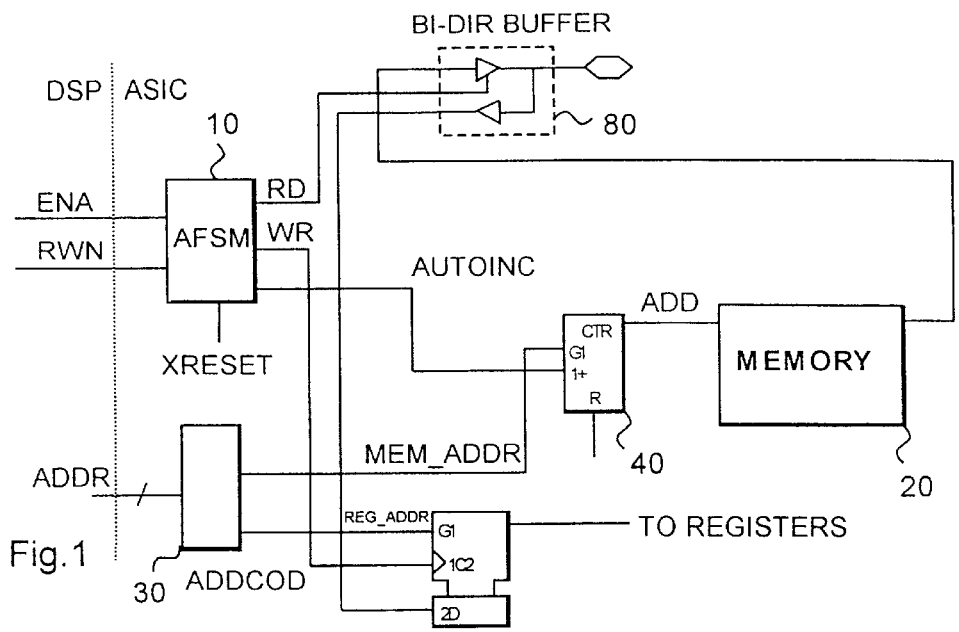
FIG. 1 shows a first preferred embodiment of the invention.

FIG. 1 shows a first preferred embodiment of the arrangement of the invention. The arrangement is used between two digital circuits. Said circuits in the solution presented in the figure are a DSP processor and an ASIC. Timing signals are applied between the circuits, the timing signals not necessarily having to be as accurate as those employed in prior art solutions. The arrangement comprises means 20 whereto data is written and wherefrom it is read. In practice, the means 20 are placed in the ASIC and used as a memory. In addition, the arrangement comprises means 30 arranged to generate an address needed in reading and writing. Writing and reading the data is accomplished on the basis of said address. The invention is particularly well suited to be used for example in the AT&T 16XX DSP processor family. In practice, the means 30 are located in the ASIC.

The DSP processor generates ENA (Enable) and RWN (Read/Write not) control signals. The ENA signal is employed as a chip select signal in the circuit. The read and write operations addressed to the ASIC are performed by means of the ENA signal. Depending on the RWN signal state, the data is either written to or read from the ASIC. Furthermore, the arrangement comprises means 10 which shape the control signals generated by the processor. The means 10 shape the signals so that writing to and reading from the memory takes place in a controlled way. Timing signals generated by the means 10 enable the processor to write to and read from the ASIC without timing problems. In practice, the means 10 are implemented by an asynchronous state machine (AFSM= Asynchronous Finite State Machine). The means 10 generate RD (Read), WR (Write) and AUTOINC signals from the ENA and RWN signals. The means 10 change their state without a synchronizing signal arriving to the means 10.

The arrangement further comprises means 40 used as a counter. The AUTOINC signal generated by the means 10 is used for indicating the read operation that has taken place. Indicating the read operation enables the value of the above mentioned counter to be incremented for example during a burst read operation. An address space has been predefined for the processor, and the processor usually locates its operation on the basis of a given address. If necessary, the processor can address for example to a location with registers defined therein. The AUTOINC signal ensures that the processor operations are addressed to the desired location. The read and write signals generated by the means 10 are addressed to a desired location by means of separate address signals. The AUTOINC and write signals generated by the means 10 are employed to control the means 40 particularly in FIFO type operations.

Figure 2:
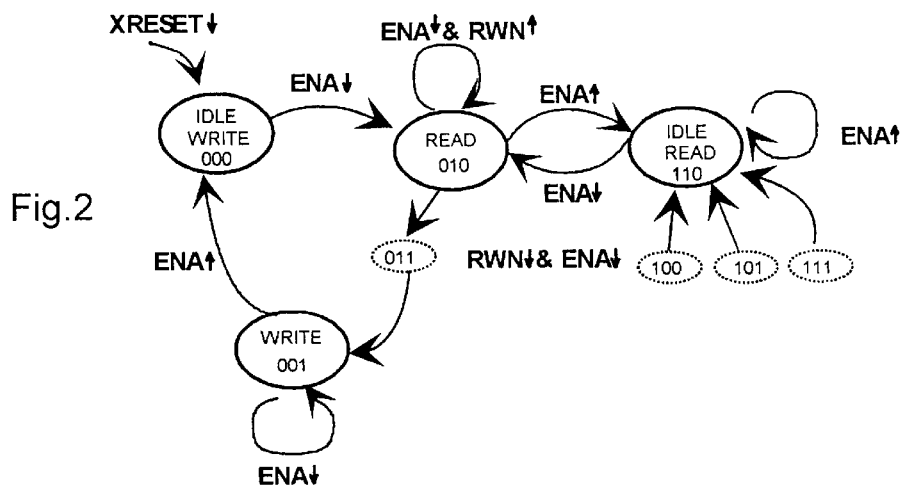
FIG. 2 shows a state diagram of the state machine employed in the arrangement of the invention.

The means 10 change their state on the basis of the received control signals. FIG. 2 presents a state diagram illustrating the state transfer of the means. It is particularly important to note the state transfer conditions affecting the state transfer. Only two signals are employed when a transfer from one state to the other is performed. First, an XRESET signal is supplied to the means 10. When the XRESET signal falls to '0', the initialization of the means takes place and the means 10 change to an idle write state. In the figure, the idle write state is given a value '000'. The means 10 remain in this state until the ENA signal falls. When the ENA signal falls, the idle write state changes to a read state whose value is for example '010'. The means 10 remain in this state as long as the RWN signal is high and the ENA signal is low.

A transfer can be performed from the read state to two different states: an idle read state and a write state. The read state changes to the idle read state when the ENA signal rises. The idle read state receives a value '110'. The idle read state is maintained until the ENA signal falls. Thus, in the idle read state, the value of the ENA signal remains high. When the ENA signal falls, the idle read state changes back to the read state.

The read state changes to the write state when the ENA signal remains low and the RWN signal reaches '0'. The write state changes back to the idle write state when the ENA signal rises. In practice, the means 10 change their state according to the above described state transfer conditions. The activity level of the signals used in the state transfer conditions can be changed according to the activity level of the arriving signals. The transfer condition from one state to the other may then alter, whereby the state can be changed when for example the signal is falling instead of rising. In the figure, dotted lines show the states employed to ensure that only the state of one bit changes during the transfer from one state to the other.

Figure 3:
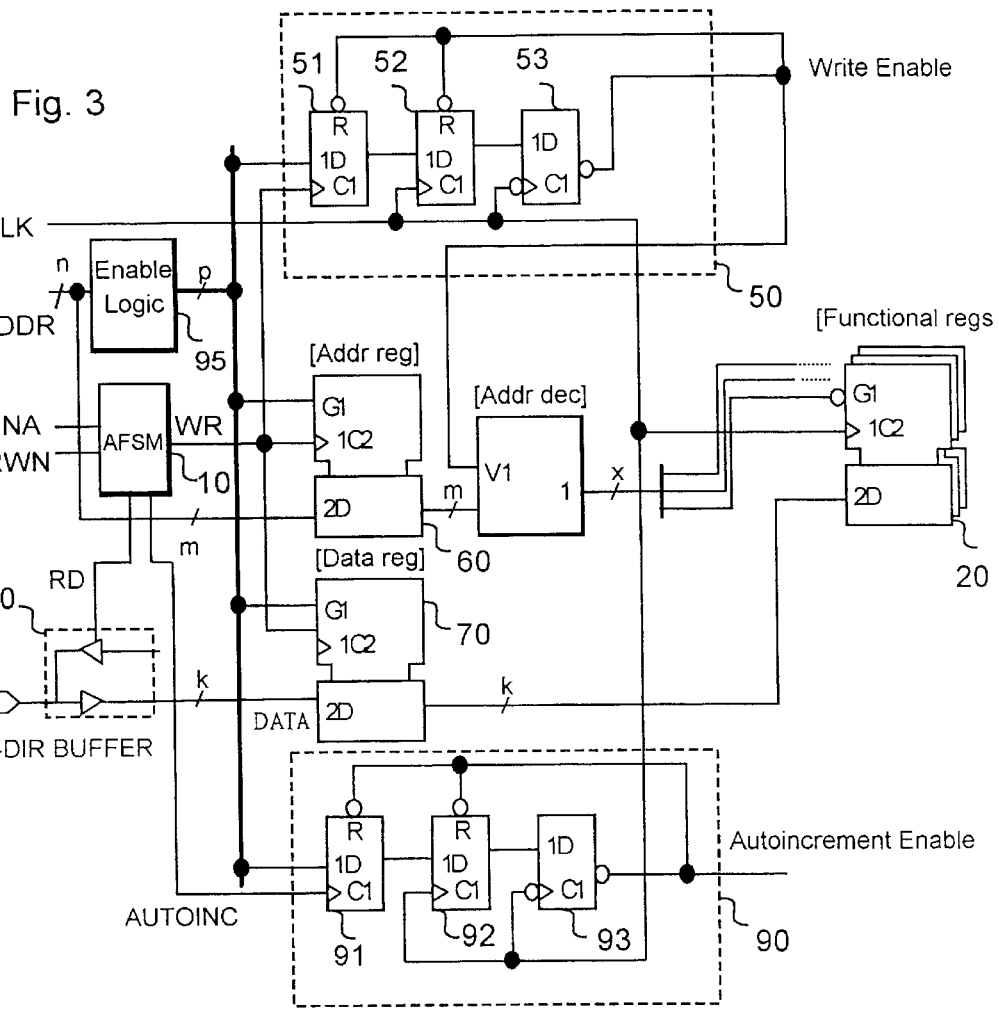
FIG. 3 shows the arrangement of the invention in more detail.

FIG. 3 shows the arrangement between a processor and an ASIC in more detail. In addition to the above mentioned means, the arrangement also comprises means 50. The means 50 comprise a number of flip-flops 51, 52 and 53. The flip-flops 52 and 53 are clocked by an ASIC clock with read and write signals being synchronized thereto, whereas the flip-flop 51 is clocked by a read signal generated by the means 10. The flip-flops 52 and 53 are clocked by a clock signal (CLK) that can be generated freely. In the solution presented in the figure, the above mentioned clock signal is generated by the ASIC. Free generation is here taken to mean the option of also generating the clock signal elsewhere than in the processor.

In addition, the arrangement comprises an address register 60, a data register 70, a buffer 80, means 90 and means 95. Means 20 in the arrangement presented in the figure have been implemented by means of registers. The processor is able to generate for example an ENA signal to be used when it falls to '0' for performing the read or write operation addressed to the ASIC. The write and read operations are more specifically addressed for example to the registers in the means 20. For performing the read operation, the RWN signal must be high, i.e. in '1'. The means 60 and 70 are in practice registers that are clocked in the solution presented in the figure by write signals generated by the state machine.

Performing the write operation requires that the RWN signal is low in '0' simultaneously with the ENA signal. The processor performs the read operations preferably through the buffer 80. The buffer used in the arrangement presented in the figure is bi-directional. The operation of the means 10 prevents the buffer 80 from switching off at a wrong time. The means 10 also prevent the buffer from switching on at a wrong time. If the buffer operates at a wrong time, the write or read operation may be addressed to an entirely wrong destination causing the failure of a desired operation.

The means 90 receive an AUTOINC signal generated by the means 10. The means 90 use the received signal as a clock signal and generate an Auto-increment Enable signal from the received signal. The means 90 comprise a number of flip-flops 91, 92 and 93. The first flip-flop 91 is clocked by the AUTOINC signal that has been generated, whereas the flip-flops 92 and 93 are clocked by an ASIC clock signal. In the arrangement, the AUTOINC signal generated by the means 10 is synchronized to the ASIC clock signal (CLK).

Figure 4:
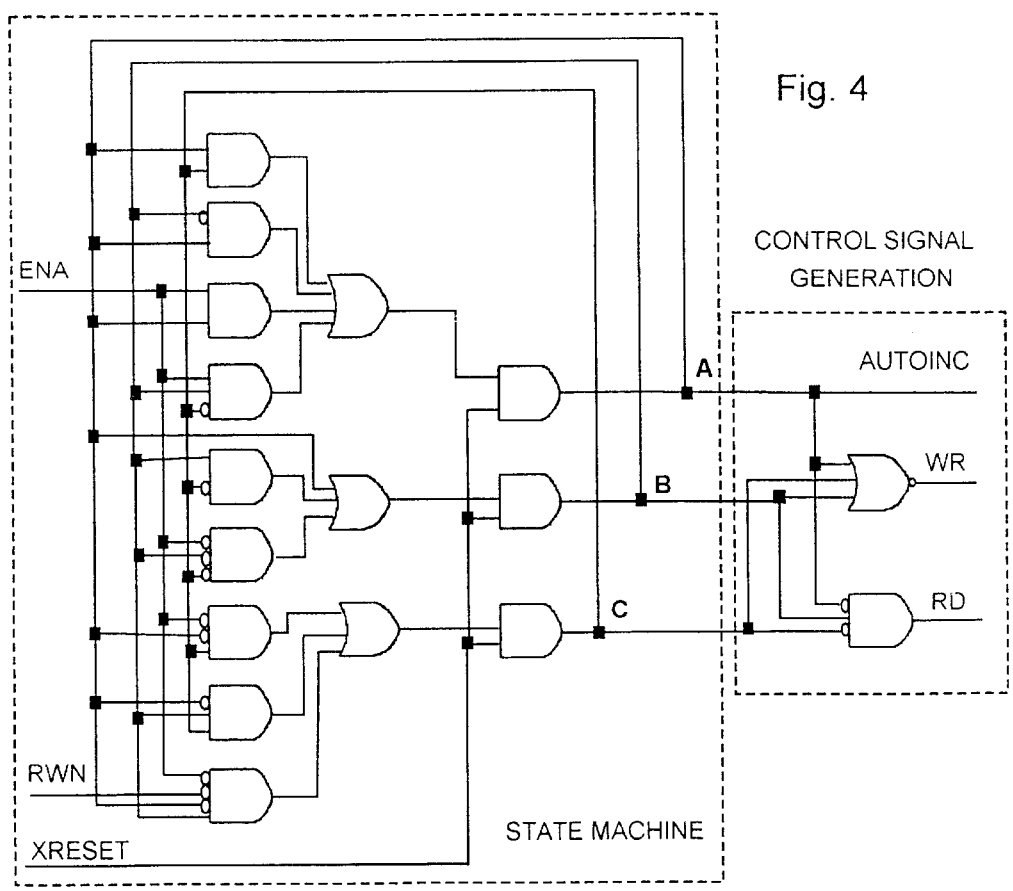
FIG. 4 shows the structure of the state machine in more detail.

FIG. 4 illustrates an internal structure of an ASFM state machine in more detail. The state machine presented in the figure is preferably implemented by a feedback combinational logic. However, the state machine can also be implemented in some other way. In the solution presented in the figure, AUTOINC, WR and RD signals are generated from RWN, ENA and XRESET signals supplied to the output of the state machine in such a way that the solution fulfils the conditions of the above described state diagram. The AUTOINC, WR and RD signals that have been generated are used for controlling the operation of the blocks in order to prevent the timing problems during the write and read operation. Points A, B and C are indicated in the state machine. Let us assume that a signal A influences at point A, a signal B influences at point B and a signal C influences at point C. The signals A, B, and C are reconnected on the output side of the state machine. The state machine of the FIG. 4 fulfils the conditions of the state diagram in FIG. 2.

In the following, the signals influencing at the points A, B and C in the state machine are presented. In addition, the RD, WR and AUTOINC signals based on the Karnaugh's map are also presented. If the signal A influences at point A, then the signal influencing next, NEXT_A at the corresponding point can be calculated. In practice, the AUTOINC signal can be presented by means of only the signal A.

$$NEXT\_A = (A*C + A*\bar{B} + ENA*A + ENA*B*\bar{C})*\overline{XRESET}$$

$$NEXT\_B = (A + B*\bar{C} + \overline{ENA}*\bar{B}*\bar{C})*\overline{XRESET}$$

$$NEXT\_C = (\overline{ENA}*\bar{A}*\bar{C} + \bar{A}*\bar{B}*\bar{C} + \overline{ENA}*\overline{RWN}*\bar{A}*\bar{B})*\overline{XRESET}$$

$$RD = \bar{A}*\bar{B}*\bar{C}$$

$$WR = \overline{(\bar{A} + \bar{B} + \bar{C})}$$

$$AUTOINC = A*B*\bar{C}$$

Although the invention is described above with reference to the examples in the accompanying drawings, it is obvious that the invention is not restricted thereto but it can be modified in many ways within the scope of the inventive idea presented in the accompanying claims.

What is claimed is:

1. A method for connecting a processor to an Application Specific Integrated Circuit, the method comprising:
    the processor generating control signals being employed when data is read from and written to the Application Specific Integrated Circuit;
    an asynchronous state machine receiving the control signals generated by the processor;
    the asynchronous state machine generating read and write signals based on the received control signals by the asynchronous state machine changing its state based on the received control signals without a synchronizing clock signal being supplied to the asynchronous state machine; and
    generating an auto-incrementing signal that indicates a read operation that has taken place.

2. The method of claim 1, wherein the processor is a digital signal processor connected to the Application Specific Integrated Circuit by a data bus whose operation is controlled by the control signals that have been generated.

3. The method of claim 1, further comprising synchronizing a clock signal employed in the Application Specific Integrated Circuit to the auto-incrementing signal that has been generated.

4. The method of claim 1, further comprising preventing, by means of state changes, the read and write operations from intermixing when the processor at least one of writes data to or reads data from the Application Specific Integrated Circuit.

5. The method of claim 1, wherein the read and write signals are generated based on at least two received control signals.

6. The method of claim 1, wherein the Application Specific Integrated Circuit includes registers that are clocked by the write signals generated by the asynchronous state machine.

7. A method for connecting a processor to an Application Specific Integrated Circuit, the method comprising:
    the processor generating control signals being employed when data is read from and written to the Application Specific Integrated Circuit;
    an asynchronous state machine receiving the control signals generated by the processor;
    the asynchronous state machine generating read and write signals based on the received control signals by the asynchronous state machine changing its state based on the received control signals without a synchronizing clock signal being supplied to the asynchronous state machine.
    generating an auto-incrementing signal that indicates a read operation that has taken place; and
    employing a counter whose value is incremented by the auto-incrementing signal after the read operation has been accomplished to address the read operation to a desired location.

8. The method of claim 7, further comprising controlling the counter by the auto-incrementing and write signals in First In First Out operations.

9. A method for connecting a processor to an Application Specific Integrated Circuit, the method comprising:
    the processor generating control signals being employed when data is read from and written to the Application Specific Integrated Circuit;
    an asynchronous state machine receiving the control signals generated by the processor;
    the asynchronous state machine generating read and write signals based on the received control signals by the asynchronous state machine changing its state based on the received control signals without a synchronizing clock signal being supplied to the asynchronous state machine; and
    synchronizing the read and write signals to a clock frequency employed in the Application Specific Integrated Circuit.

10. An arrangement for connecting a processor to an Application Specific Integrated Circuit, which processor generates control signals being employed when data is read from and written to the Application Specific Integrated Circuit, which arrangement comprises:
    receiving means for receiving control signals from the processor and generating read and write signals based on the received control signals, the receiving means being implemented by an asynchronous state machine changing its state based on the received control signals, and the receiving means changing their state without the need of a synchronizing clock signal,
    wherein the receiving means generate an auto-incrementing signal used for indicating a read operation that has taken place.

11. The arrangement of claim 10, wherein the receiving means are located in the Application Specific Integrated Circuit and the receiving means are implemented by feedback combinational logic.

12. The arrangement of claim 10, wherein the processor employed in the arrangement is a digital signal processor that is connected to the Application Specific Integrated Circuit by a data bus whose operation is controlled by the processor using the control signals the processor has generated.

13. The arrangement of claim 10, the arrangement further comprising counting means used as a counter whose value is incremented by the auto-incrementing signal so as to address the read operation at a right location after the read operation has taken place.

14. The arrangement of claim 13, wherein the auto-incrementing signals and write signals generated by the receiving means control the counting means in First In First Out operations.

15. The arrangement of claim 13, wherein the receiving means prevent the read and write operations from intermixing when the processor at least one of writes data or reads data from the Application Specific Integrated Circuit.

16. The arrangement of claim 10, wherein a clock signal is supplied to the arrangement enabling the clock signal to be generated freely elsewhere than in the processor.

17. The arrangement of claim 10, wherein the receiving means change their state and generate the read and write signals based on at least two received signals.

18. An arrangement for connecting a processor to an Application Specific Integrated Circuit, which processor generates control signals being employed when data is read from and written to the Application Specific Integrated Circuit, comprising:

receiving means for receiving control signals from the processor and generating read and write signals based on the received control signals, the receiving means being implemented by an asynchronous state machine changing its state based on the received control signals, and the receiving means changing their state without the need of a synchronizing clock signal; and auto-incrementing enable signal generating means operationally connected to the receiving means, wherein the auto-incrementing signal is synchronized to an Application Specific Integrated Circuit clock.

19. The arrangement of claim 18, wherein the auto-incrementing enable signal generating means comprise a plurality of flip-flops, from which at least one flip-flop is clocked by the auto-incrementing signal.

20. An arrangement for connecting a processor to an Application Specific Integrated Circuit, which processor generates control signals being employed when data is read from and written to the Application Specific Integrated Circuit, comprising:

receiving means for receiving control signals from the processor and generating read and write signals based on the received control signals, the receiving means being implemented by an asynchronous state machine changing its state based on the received control signals, and the receiving means changing their state without the need of a synchronizing clock signal; and synchronizing means for synchronizing the control signals generated by the processor to a clock of the Application Specific Integrated Circuit.

21. The arrangement of claim 20, wherein the synchronizing means includes a plurality of flip-flops from which at least two flip-flops are clocked by a clock of the Application Specific Integrated Circuit.

22. An arrangement for connecting a processor to an Application Specific Integrated Circuit, which processor generates control signals being employed when data is read from and written to the Application Specific Integrated Circuit, which arrangement comprises:

receiving means for receiving control signals from the processor and generating read and write signals based on the received control signals, the receiving means being implemented by an asynchronous state machine changing its state based on the received control signals, and the receiving means changing their state without the need of a synchronizing clock signal, wherein the processor generates an "enable" control signal used by the processor for selecting the Application Specific Integrated Circuit and a "read/write no" control signal used for selecting the read or write operation.

23. An arrangement for connecting a processor to an Application Specific Integrated Circuit, which processor generates control signals being employed when data is read from and written to the Application Specific Integrated Circuit, comprising:

receiving means for receiving control signals from the processor and generating read and write signals based on the received control signals, the receiving means being implemented by an asynchronous state machine changing its state based on the received control signals, and the receiving means changing their state without the need of a synchronizing clock signal; and a plurality of registers that are clocked by the write and read signals generated by the asynchronous state machine.

* * * * *